United States Patent [19]
White et al.

[11] Patent Number: 5,819,983
[45] Date of Patent: Oct. 13, 1998

[54] LIQUID DISPENSING SYSTEM WITH SEALING AUGERING SCREW AND METHOD FOR DISPENSING

[75] Inventors: Thomas J. White, Hampton, N.H.; William A. Cavallaro, Bradford, Mass.

[73] Assignee: Camelot Sysems, Inc., Haverhill, Mass.

[21] Appl. No.: 562,068

[22] Filed: Nov. 22, 1995

[51] Int. Cl.$^6$ ........................................................ B67B 7/00
[52] U.S. Cl. ............................ 222/1; 222/333; 222/413; 198/670
[58] Field of Search ................................ 222/1, 310, 311, 222/333, 413; 198/670, 674

[56] References Cited

U.S. PATENT DOCUMENTS

| | | | |
|---|---|---|---|
| 4,133,460 | 1/1979 | Jerpbak | 222/413 X |
| 4,322,021 | 3/1982 | Olsson | 222/311 X |
| 4,773,354 | 9/1988 | Wilbur | 222/413 X |
| 4,826,361 | 5/1989 | Merz . | |
| 4,938,391 | 7/1990 | Grundler | 222/413 X |
| 5,524,796 | 6/1996 | Hyer . | |
| 5,553,742 | 9/1996 | Maruyama et al. | 222/1 |
| 5,564,606 | 10/1996 | Engel | 222/413 X |

OTHER PUBLICATIONS

Hogan, ed., "Adhesive Dispenser Provides 2% Volume Repeatability," Design News, Apr. 11, 1994.
LCC/Dispensit, "Dispensit® Model 1000 Series," (1993).
Camelot Systems, Inc., "CAM/ALOT Liquid Dispensing Systems" Oct. 1994.
ASYMTEK, "A–600 Series Automated Fluid Dispensing Systems," Sep. 1995.
Bouras, Carlos E. and Alec. J. Babiarz, "Adhesive Dispensing for Flip Chip–on–Board," Electronic Packaging & Production (Oct. 1995).
Universal Instruments Corporation, "GDM1," Surface Mount (1994).
Engel, Jack, "Selecting The Proper Dispensing Tip," Surface Mount Technology (Oct. 1990).
ADM Options, "Optional Equipment for ADM–Automatic Dispensing Systems," Creative Automation (date unknown).
Panasert HD Series, "Three Types of Dispensing Nozzles Support a Wide Range of Chips for Reliable High–Speed Adhesive Application" (date unknown).

*Primary Examiner*—Gregory L. Huson
*Attorney, Agent, or Firm*—Hale and Dorr LLP

[57] ABSTRACT

A liquid dispenser has an augering screw that serves both a metering function and a valving function. The augering screw is axially movable between a position in which fluid can flow and a sealing position in which liquid flow through the nozzle is substantially prevented. The screw is preferably designed with a curved contour between the threads and with a plurality of thread-defining channels to allow liquid to fill more completely around the screw and to dispense more liquid with fewer screw turns than prior screw designs.

29 Claims, 7 Drawing Sheets

LIQUID DISPENSING SYSTEM WITH SEALING AUGERING SCREW AND METHOD FOR DISPENSING

FIELD OF THE INVENTION

This invention relates to a system and method for dispensing metered amounts of viscous liquid onto a medium.

BACKGROUND OF THE INVENTION

Different types of machines are used for dispensing small metered amounts of liquid for a variety of applications. In the assembly of surface mount printed circuit boards, one application is for dispensing many small dots of adhesive liquid on a circuit board for connecting components; another is for dispensing material over an area for encapsulating chips and/or for underfilling flip chips. Such dispensing machines are expected to run continuously to achieve high throughput, and are also expected to have a high degree of repeatability, i.e., to be able to dispense dots or areas with the same size within a very small tolerance.

Some systems for dispensing dots, including earlier designs, used bursts of high pressure on a container of liquid and had a separate valve for controlling flow. This type of system was improved upon with a system that used a positive rotary displacement pump instead of bursts of high pressure. In one model manufactured by Knight Tool Co., the assignee of the present invention, and distributed by CAM/ALOT under the name Camelot®, an augering screw is housed in an augering chamber and is rotated to provide a carefully metered amount of liquid. A motor is coupled to the screw with a controllable electromagnetically operated clutch. The clutch has a top plate that is continuously rotated by the motor, and a bottom plate that is rotatably coupled to the augering screw through intermediate coupling members, including a metal bellows. The liquid to be dispensed is held in a cylindrical container, and is provided to the augering chamber under constant pressure of about 10 PSI, a pressure that is considered rather low.

To dispense liquid, a controller provides to the clutch a short, timed, electrical signal that induces magnetic attraction between the top and bottom plates. This attraction causes the plates to be engaged and to rotate together for a short period of time, thus causing the augering screw to rotate to dispense a small amount of liquid from the augering chamber through a nozzle. The controller also controls lead screw motors for moving the dispenser to a desired location along three mutually orthogonal axes.

Other systems that use a positive rotary displacement pump drive the pump with a stepper motor that has to be turned on and off frequently. Such motors, however, must be sufficiently durable so that they can start and stop many times without failure.

Dispensing system of this general type can be used to dispense an area of highly viscous liquid to cover the top of a semiconductor device for encapsulation, or to provide underfilling around and under a flip chip to provide thermal conductivity. When the liquid hardens over or around the device, it packages and protects the device. To cover the area, the dispenser can be moved in a selected pattern, such as a rastering pattern or a spiral pattern.

In such dispensing systems, the accuracy of the volume dispensed is critically important. The material used for encapsulation and underfill is filled with abrasive particles and has a very high viscosity, typically from $10^5$ to $10^6$ centipoise. Consequently, pressure of at least about: 30 to 40 PSI is provided to the container that holds the liquid to overcome friction in the container and to dispense the liquid. If the pressure is insufficient to properly feed the augering screw, cavities of air can develop in the liquid, adversely affecting accuracy (this problem is known as "cavitation"). Because this pressure is relatively high compared to the dot dispensing systems, however, the liquid can bleed through the augering chamber and leak through the nozzle between dispensing cycles. Such leaked liquid can have a substantial detrimental effect on the accuracy.

To prevent such bleeding and leaking, some models of dispensers have a direct drive stepper motor with a reversible drive for drawing the liquid back after a dispensing cycle is completed. Reversing a motor quickly and frequently can adversely affect wear on the motor, however, and can also adversely affect accuracy.

OBJECTS AND SUMMARY OF THE INVENTION

An object of the present invention is to improve the accuracy of a liquid dispensing system.

Another object of the present invention is to provide a reliable liquid dispensing system that does not leak between dispensing cycles.

Still another object is to provide a liquid dispensing system with parts that can withstand repeated use and thus last for a long time.

Yet another object is to provide a dispenser that meets these other objects with a compact assembly.

The present invention includes a liquid dispensing system and a method for dispensing while substantially preventing undesired leakage through an outlet of a nozzle between dispensing cycles. The dispenser has a cartridge with a housing that encloses an augering screw and an augering chamber. The chamber receives a liquid input, and the augering screw augers the liquid from the chamber, through an outlet in the nozzle, and onto a medium. The augering screw also serves as a valve between the augering chamber and the outlet of the nozzle. The augering screw is controllably moved so that one end moves in and out of a valve seat between the augering chamber and the outlet of the nozzle. The valve seat can be formed in the nozzle itself, or between the augering chamber and the nozzle. When the screw is in the valve seat, the seal is sufficient to substantially prevent the liquid from flowing past the seal.

The augering screw preferably has an improved design in its threading and shape, including a curved contour along the axial direction between threads. This contour reduces air spaces around the screw and increases the percentage of the area of the screw that is in contact with the liquid. Because of the improved amount of contact area, there is less opportunity for air pockets to form around the screw, thus reducing changes in pressure that can otherwise cause leaking. To increase the amount of fluid that is dispensed per rotation, the threads of the screw are formed with a plurality of helical channels, preferably two channels 180° apart about the screw. The channels are formed so that the improved screw has double the number of threads per inch compared to known prior screws.

In one preferred embodiment, the augering screw is formed integrally in a drive shaft so that the drive shaft and screw move together axially and rotatably. An annular clip is rigidly connected to the drive shaft and a piston is disposed around the drive shaft and under the clip so that it abuts the clip. The piston is biased downwardly with a spring but can receive upwardly directed gas pressure, preferably air pressure, thus causing the piston to be raised against the clip so that the screw is raised away from the valve seat. When the air pressure stops, the screw is biased downwardly by a second spring so that it rests in the valve seat. The spring can be replaced with a gas inlet so that the piston is both raised and lowered through the use of gas pressure. A manually accessible, adjustable, threaded micrometer can be provided over the piston to control spacing between the retainer clip and the shaft. This micrometer allows the user to adjustably control the height by which the shaft and screw are raised, preferably over a range of about 0–0.1 inches.

In another embodiment, the screw includes an annular nut around its lower end. The nut and the housing around the augering chamber define an annular valve seat. The augering screw is usually biased downwardly in a position such that liquid can flow. To shut off the flow of liquid, the screw is raised. By raising the screw to prevent flow, a slight suction is created, thus further preventing leakage. The downward biasing can be achieved with a spring, or gas inputs can be provided to both raise and lower the screw.

The invention further includes a method for dispensing that includes steps of axially moving an augering screw away from a valve seat, rotating the screw to dispense liquid, and axially moving the augering screw into the valve seat to seal the liquid in the augering chamber from the nozzle.

Prior to these steps, a step of adjusting the amount by which the shaft is raised can be performed. These steps of axially moving can be done by raising the screw away from the nozzle to allow flow, and lowering the screw toward the nozzle to seal the chamber, or vice versa.

In workable alternative embodiments, a liquid dispenser has a needle valve in which a vertically oriented needle is raised and lowered to form a seal with the valve seat. Extending at an acute angle relative to the vertical needle is a cartridge with an augering chamber for receiving liquid and an augering screw. In this embodiment, the augering screw meters the liquid while the needle valve is separately actuable to open and close the valve. While such a device is a workable embodiment, it is less desirable than using the screw to perform both the metering and the valving functions because it is much less compact. Another separately controllable valve can be provided, such as a rotatable ball valve having an opening that can be aligned with the passage between the augering chamber and the outlet of the nozzle.

A single augering screw serving as both a valve and an auger allows the dispensing and valving functions to be performed efficiently and compactly. By using an improved design for the augering screw, the volume of liquid that can be dispensed per revolution is increased, and leakage is further reduced because there is less change in pressure around the screw. Other features and advantages will become apparent from the following detailed description, drawings, and claims.

DETAILED DESCRIPTION

Figure 1A:
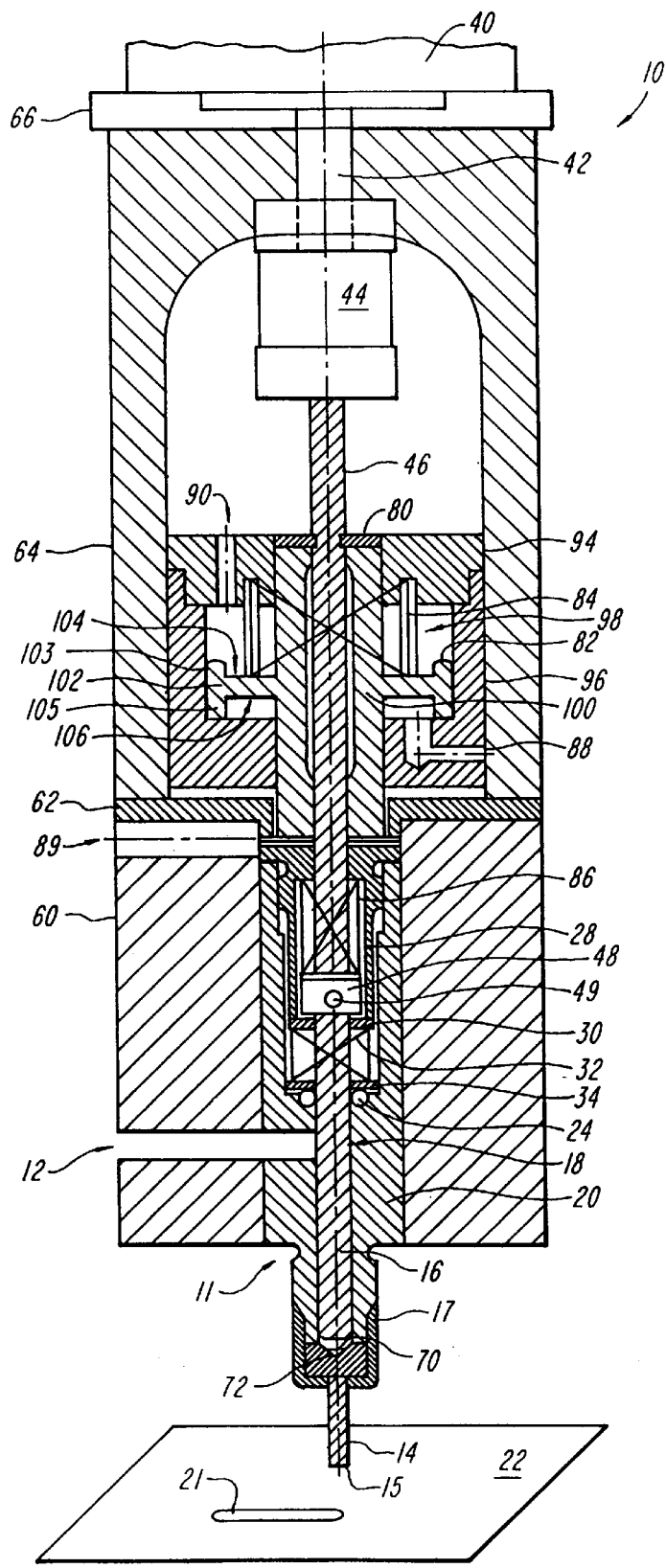
FIGS. 1(a)–1(c) are cross-sectional views of three operational states of a pump assembly according to a first embodiment of the present invention; namely, a closed state, an open state, and a transitional state, respectively.

The present invention improves the accuracy of liquid dispensing by preventing undesired leakage through a nozzle while providing a compact design and avoiding excess wear on a motor. The liquid dispensing system of the present invention has an augering screw that augers liquid and also is axially movable into and out of a valve seat. The screw thus serves as both a metering device and a valve. When liquid is to be dispensed, the augering screw is moved away from the valve seat to open a passage between an augering chamber and an outlet of a nozzle; after liquid is dispensed, the augering screw is moved into the valve seat to substantially seal the chamber from the outlet to prevent leaking. The screw also preferably has improved contours in the threading and an increased number of threads for increasing the volume and the filling of liquid around the screw, and thus to provide more liquid more efficiently with less turning.

Referring to FIGS. 1(a)–1(c) and FIG. 2, a pump assembly 10 has a cartridge 11 that receives liquid through a liquid inlet 12, and controllably directs a small amount of the liquid through an outlet 15 in a nozzle 14. The nozzle rests in a threaded nut 17 that is screwed to cartridge 11. Cartridge 11 has a housing 20 with a bore that receives an augering screw 16. An augering chamber 18 is not explicitly shown as an open area, but is a region defined between screw 16 and housing 20. Screw 16 is controllably rotated to direct liquid downwardly through outlet 15 of nozzle 14 to dispense a region 21 of liquid onto a medium 22, such as a printed circuit board.

The liquid is preferably a high viscosity liquid (more than about $10^5$ centipoise) that is dispensed over a semiconductor device to encapsulate it, or around a chip to underfill it. The liquid is preferably kept in a container (not shown) under constant pressure of about 30–40 PSI. When dispensing to encapsulate, pump assembly 10 is moved in an x-y plane that is generally parallel to the chip, and is raised and lowered along a z-axis (perpendicular to the x-y plane) with stepper motors (not shown). Depending on how the chip is mounted, it may be desirable to first create a dam around the border with a very high viscosity liquid, about $10^6$ centipoise, before filling in the region enclosed by the dam with a high viscosity liquid, about $10^5$ centipoise. These two dispensing steps would typically be done with separate dispensers mounted side-by-side. In some cases it may not be necessary to form a dam; e.g., if the chip is set in a recessed area of the circuit board. When underfilling, liquid is dispensed around the chip and is drawn under the chip to fill a vertical gap between the chip and the circuit board.

Figure 2:
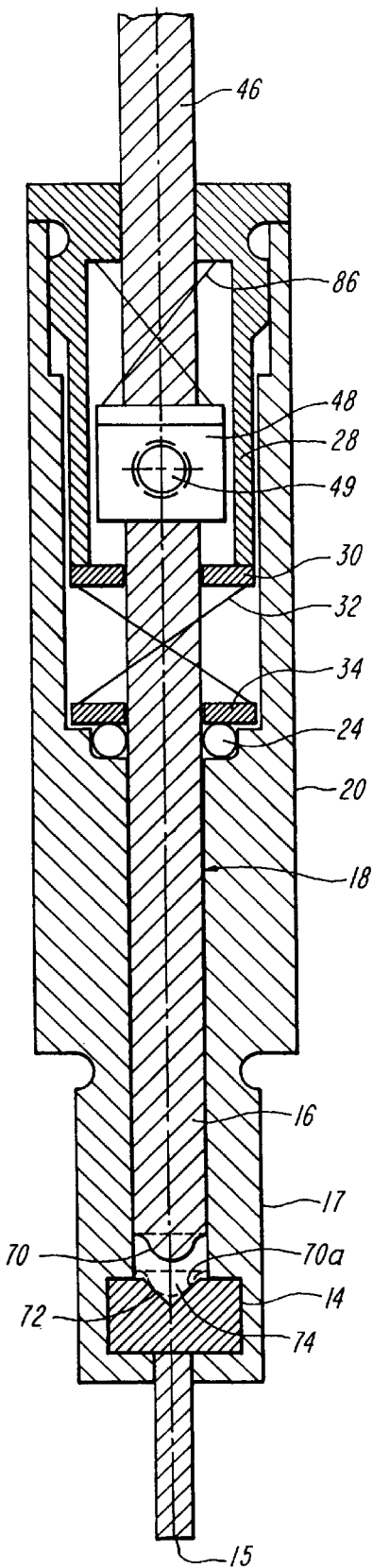
FIG. 2 is a close-up cross-sectional view of a cartridge in the pump assembly of FIGS. 1(a)–1(c).

Referring particularly to FIG. 2, augering chamber 18 is sealed off at its uppermost end with an O-ring 24 under compression from a spring 32. Spring 32 extends between a lower side of an upper first washer 30 and an upper side of a lower second washer 34, which in turn has a lower side that contacts the O-ring. First washer 30 is held down with a nut 28 that is threaded into an upper end of cartridge housing 20.

Referring again to FIGS. 1(a)–1(c), screw 16 is rotatably coupled to and driven by a motor 40. The motor turns an output shaft 42 that is connected to a flexible first coupling 44, such as a metal bellows, which is connected to drive shaft 46 with a spline (not shown) that allows relative axial movement but maintains rigid rotatable movement. Screw 16 is preferably formed by cutting threads at the lower end of shaft 46, and thus shaft 46 and screw 16 are one integral piece. These threads extend from the lower end of the shaft to a position slightly above liquid inlet 12. A collar serving as a shoulder 48 is mounted over washer 30 and is held in place with a radial set screw 49. Thus, output shaft 42, drive shaft 46, screw 16, first coupling 44, and shoulder 48 are all axially aligned, and all move together rotatably; and drive shaft 46, shoulder 48, and screw 16 move together axially.

These axial components are housed compactly in dispenser 10 with a lower housing 60 that surrounds cartridge housing 20, a lower lid 62 over lower housing 60, an upper housing 64 over lower lid 62, and an upper lid 66 over upper housing 64. Motor 40 is mounted over upper lid 66 so that output shaft 46 extends through an opening in upper lid 66.

Motor 40 can be a stepper motor that is stopped and started for short periods of time to rotate the screw. Alternatively, screw 16 can be rotatably coupled to a motor via a clutch mechanism. The design with a clutch requires the clutch as an additional component, but has an advantage in that the motor can be operated continuously, rather than stopped and started frequently. For applications with more continuous flow than dispensing dots, such as using an encapsulating liquid to cover an area, a stepper motor without a clutch may be more desirable.

Figure 1B:
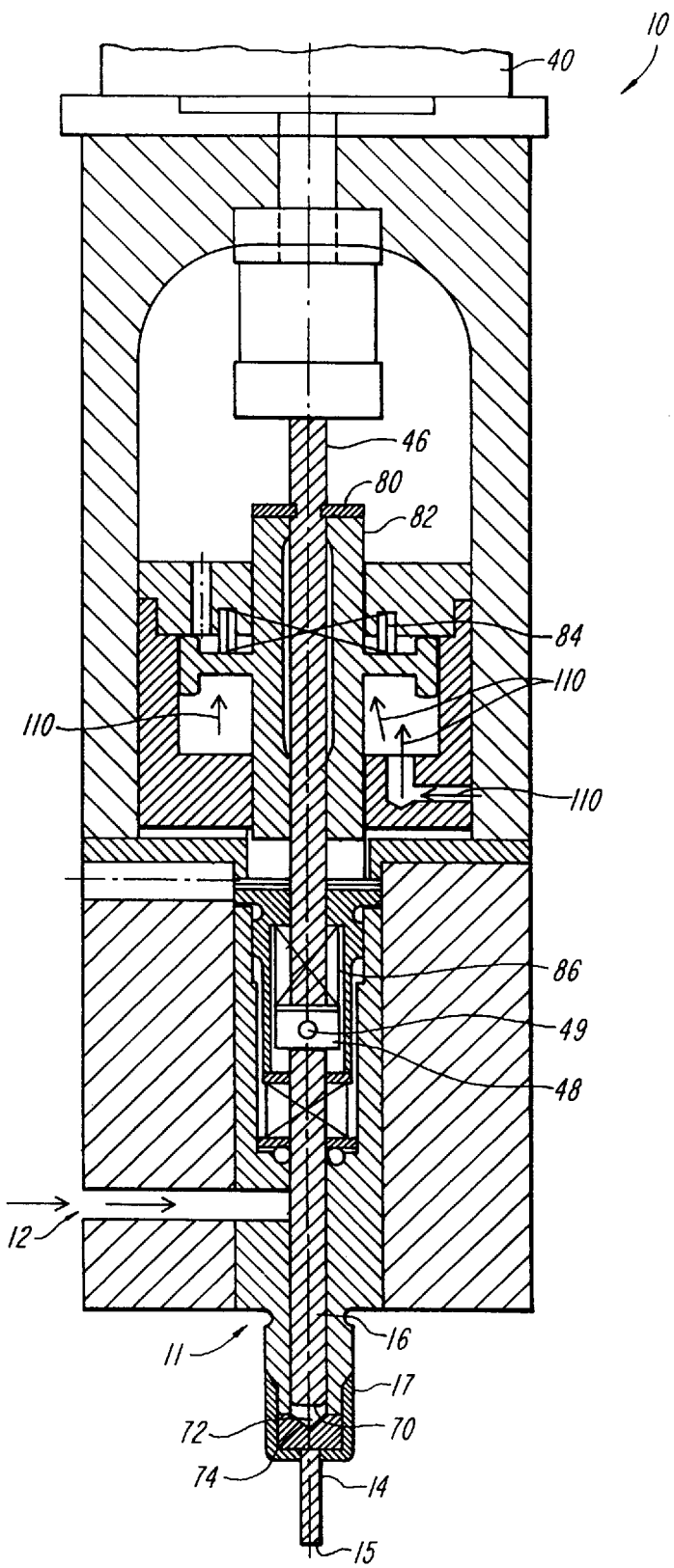
Figure 1C:
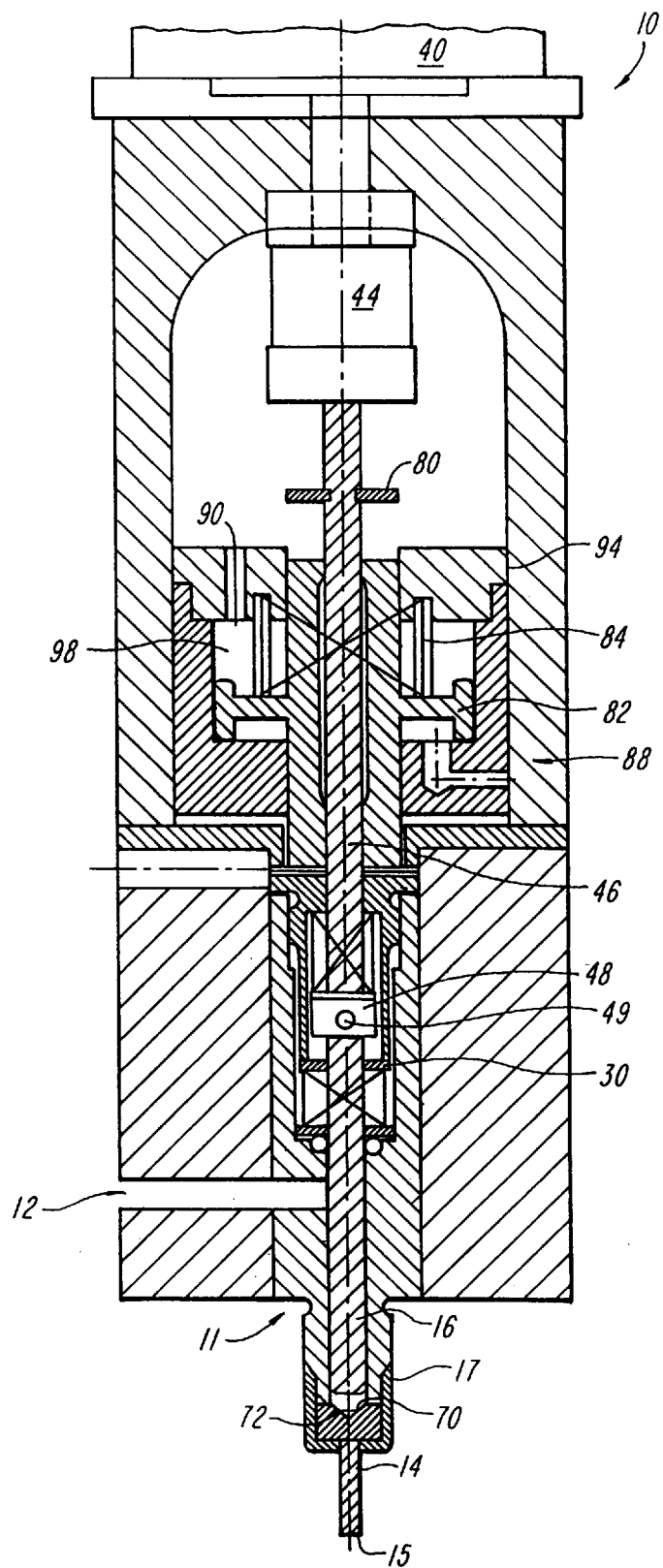

As shown here (and as in FIGS. 1(b) and 1(c)), screw 16 has a lower end 70 in an upper position such that it is spaced from a valve seat 72. As shown here, valve seat 72 is formed in nozzle 14, although a valve seat could be formed in a separate piece over the nozzle or in other ways (see FIGS. 5(a) and 5(b)). In this upper position, a passageway 74 is opened between chamber 18 and outlet 15 of nozzle 14. In a lower position, the lower end of the screw is in a position as indicated by dashed line 70a (FIG. 2) in which the lower end rests in valve seat 72. Augering screw 16 thus seals chamber 18 from outlet 15 sufficiently to substantially prevent liquid from flowing between chamber 18 and outlet 15 of nozzle 14. While lower end 70 of augering screw 16 is shown rounded and the valve seat conical, lower end 70 and valve seat 72 may take any shape that allows them to conform with each other to substantially seal against the flow of the liquid. The seal need only be sufficient for the particular liquid that is used, and that liquid may be very viscous.

The ability of augering screw 16 to be axially moved in a controllable manner results from an assembly, mounted over lower lid 62, and including a retainer clip 80 that is rigidly coupled about drive shaft 46; a piston 82 that moves axially relative to drive shaft 46; a first spring 84 that biases piston 82 downwardly; a second spring 86 that biases shoulder 48 downwardly; a pneumatic inlet 88 for providing air that drives piston 82 upwardly; and an exhaust vent 90.

Piston 82 and spring 84 are housed in and surrounded by a cup-shaped body 96 that is fixed relative to the housing and surrounded by upper housing 64. Body 96 extends around piston 82 and drive shaft 46, and has a lower central bore that is slightly larger than the diameter of piston 82 to allow piston 82 to move axially relative to body 96. An annular cap 94, which has a central bore sized to receive piston 82 for relative axial movement is rigidly mounted over cup-shaped body 96 and is also surrounded by upper housing 64.

Piston 82 has an axially elongated portion 100 with a central bore through which drive shaft 46 extends, and thus piston 82 is coaxial with drive shaft 46. Piston 82 and drive shaft 46 are spaced slightly over most of the common length, but touch at each end for stability. Where they touch, a slippery bearing surface allows relative rotatable movement. Such a slippery surface can be provided by using a slippery finishing coating, such as a nickel and PTFE-based coating.

At the axial midpoint of elongated portion 100 of piston 82, an integral annular shelf 102 extends radially outwardly from elongated portion 100. At the outer end of shelf 102 are an upper lip 103 and a lower lip 105 that define in the shelf an upper annular groove 104 and a lower annular groove 106, respectively. Drive shaft 46 and cup-shaped body 96 define an annular region 98 within which first spring 84 and shelf 102 of piston 82 move vertically. First spring 84 is compressed vertically between a lower side of cap 94 and piston 82 at its upper annular groove 104 to bias piston 82 downward.

Pneumatic inlet 88 has a horizontal inward branch and a vertical upward branch for directing air upwardly into region 98 underneath lower annular groove 106. Exhaust vent 90 extends vertically through cap 94 to allow air to escape region 98 to a region surrounded by upper housing 64. Upper housing 64 has openings in its sides, preferably one large opening on each of two opposite sides, to allow air to escape and to provide useful access to portions of the dispensers by the user.

At its uppermost end, elongated portion 100 of piston 82 abuts, but is not rigidly connected to, retainer clip 80. Clip 80 is annular with a cross-sectional area similar to that of elongated portion 100. A bearing surface where piston 82 meets clip 80 is slippery so that piston 82 does not rotate with retainer clip 80 and drive shaft 46 when piston 82 abuts clip 80.

The different positions of drive shaft 46 and screw 16 are illustrated in FIGS. 1(a)–1(c), which show three respective positions: a non-dispensing position, a dispensing position, and a representation of a transitional position between the dispensing and non-dispensing positions.

Referring particularly to the non-dispensing position shown in FIG. 1(a), pneumatic inlet 88 is not receiving air pressure, so first spring 84 biases piston 82 downwardly so that piston 82 bottoms out so that lower lip 105 contacts cup-shaped body 96. A horizontally disposed exhaust vent 89 allows air to be vented from a region between piston 82 and nut 28. Second spring 86, between nut 28 (which is fixed relative to housing 20) and shoulder 48, biases shoulder 48 downwardly, thus causing lower end 70 of augering screw 16 to be in valve seat 72. In this position, lower end 70 seals augering chamber 18 sufficiently to substantially prevent any viscous liquid from passing from augering chamber 18 to outlet 15 of nozzle 14.

Referring to FIG. 1(b), when it is desired for pump assembly 10 to dispense liquid, air is provided under pressure from a pneumatic drive through pneumatic inlet 88 as indicated by flow arrows 110. This air flow forces piston 82 upwardly, thus urging retainer clip 80 upwardly. Because clip 80 is rigidly connected to drive shaft 46, from which screw 16 is integrally formed, the upward movement of piston 82 causes drive shaft 46 (and hence screw 16) to be raised. Second spring 86, which biases shoulder 48 downwardly, is also compressed by the upward movement of piston 82 and clip 80. The upward force provided by the air through pneumatic inlet 88 should therefore be sufficient to counteract the combined downward biasing forces of first spring 84 and second spring 86. When lower end 70 of screw 16 is raised away from valve seat 72, passageway 74 is opened between augering chamber 18 and nozzle 14. Screw 16 can now be rotated by motor 40 to cause liquid to be dispensed through nozzle 14.

FIG. 1(c) illustrates a transitional position between the open position of FIG. 1(b) and the closed position of FIG. 1(a). When the air pressure provided through air inlet 88 stops, the air vents out of region 110 through inlet 90, and first spring 84 again biases piston 82 downward. Piston 82 is not connected to retainer clip 80, so it does not pull retainer clip 80 downwardly. But because piston 82 is no longer biasing drive shaft 46 and shoulder 48 upwardly, second spring 86 between nut 28 and shoulder 48 can again bias shoulder 48 downwardly, thus pushing downwardly on drive shaft 46. This downward movement returns clip 80 to its position in FIG. 1(a) in which it has a top surface that is generally co-planar with a top surface of cap 94, and returns lower end 70 of augering screw 16 to valve seat 72 to block passage 74 (FIG. 1(b)) between augering chamber 18 and nozzle 14 to prevent any leakage of liquid.

FIG. 1(c) illustrates the interaction between first spring 84 and second spring 86 only for a moment after the air inlet stops; in actual use, however, as piston 82 moves downwardly, drive shaft 46 and clip 80 will follow piston 82 because of the biasing of second spring 86 so that there would be at most a slight gap between retainer clip 80 and piston 82.

Figure 3:
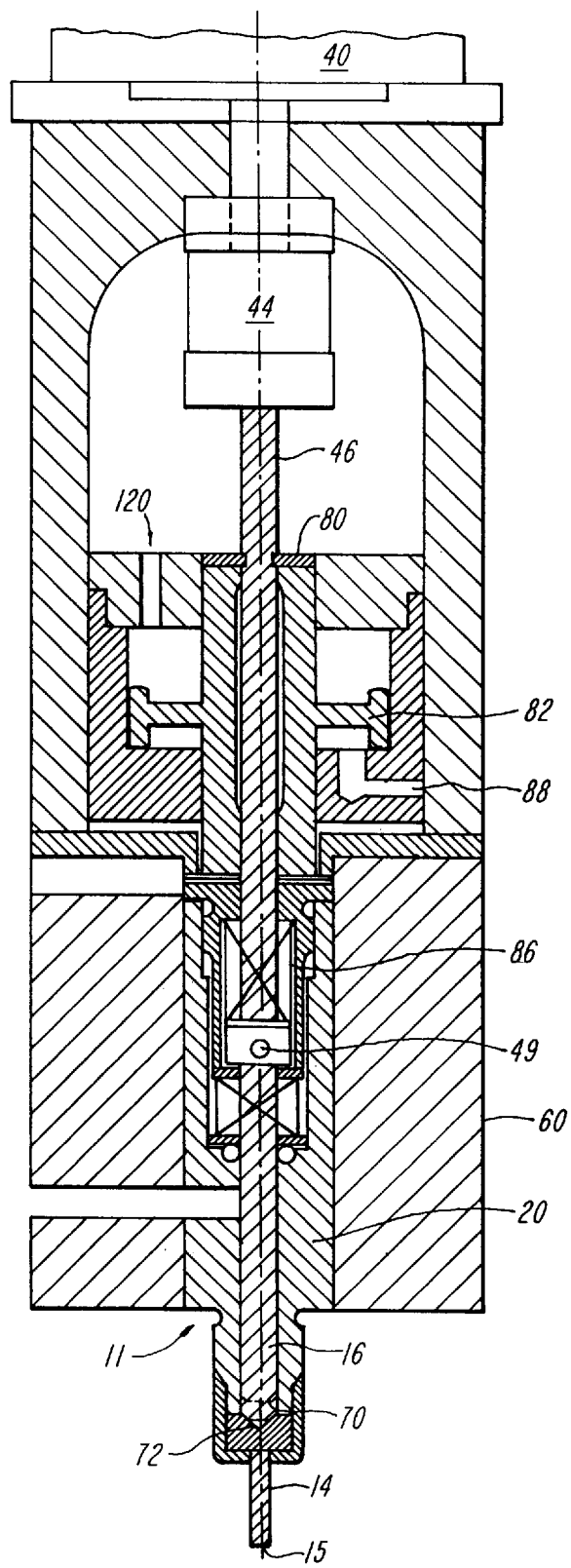
FIG. 3 is a cross-sectional views of a pump assembly according to a second embodiment of the present invention.

Referring to FIG. 3, in a second embodiment of the present invention, a spring for biasing piston 82 downwardly is omitted, and vent 90 in FIGS. 1(a)–1(c) is replaced with a second pneumatic air inlet 120. In this embodiment, pneumatic air inlet 88 is used to receive air to drive piston 82 and clip 80 upwardly as shown in FIG. 1(b), and then air is introduced through inlet 120 to assist in driving piston 82 downwardly. The forced air provided at pneumatic input 120 assists spring 86 in returning drive shaft 46 and augering screw 16 back to the lower position in which lower end 70 rests in valve seat 72. In this embodiment, pneumatic inlets 88 and 120 also serve as pneumatic outlets when air is introduced through the other of the two. The pneumatic drives for the two inlets can be different or combined.

Figure 4:
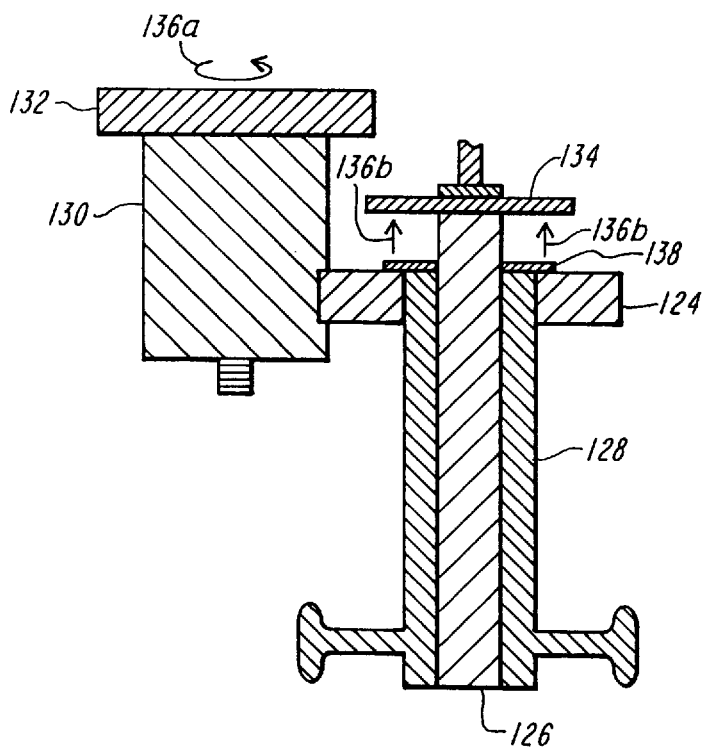
FIG. 4 is a cross-sectional view of a third embodiment of the present invention with an adjustable micrometer.

Referring to FIG. 4, in a third embodiment, the pump assembly further includes a micrometer 124 that allows the amount of vertical movement of the drive shaft to be controlled by a user. A piston 128 is threaded over a small area at its top end, and micrometer 124 has a threaded bore so that it is screwed over that area of piston 128. Micrometer 124 surrounds, but is not rigidly connected to, drive shaft 126. At its top surface, a non-metal insert 138 is snapped into micrometer 124. At its outer diameter, micrometer 124 has gear teeth that mesh with teeth of an elongated gear 130. Gear 130 is rigidly connected to a knurled knob 132 so that gear 130 can be manually rotated by rotating knob 132. Knob 132 is preferably easily manually accessible to the user. Gear 130 has sufficient axial length and an appropriate bearing surface to allow micrometer 124 to travel axially relative to gear 130.

In FIG. 4, micrometer 124 is shown at a lowest position, about 0.1 inches from a retainer clip 134 that is rigidly connected to drive shaft 126 (note that the dimensions here are exaggerated and not to scale). In this position, as piston 128 is raised, insert 138 barely touches clip 134, and therefore shaft 126 is not raised.

As knob 132 is turned as indicated by arrow 136a, micrometer 124 moves axially upwardly relative to gear 130, shaft 126, piston 128, and clip 134 as indicated by arrows 136b. At its maximum upward position, insert 138 contacts (or nearly contacts) clip 134. At this position, when piston 128 is raised (e.g., under air pressure), drive shaft 126 is raised to its maximum amount.

The micrometer can alternatively be constructed as a large knurled ring that is manually accessible. In this case, the separate knurled knob 132 and elongated gear 130 can be eliminated, thus reducing the number of parts.

The position of knob 132 is preferably fixed with a resistive clamp (not shown) that provides frictional forces to keep the knob in position. Alternatively, a collar can be put under the micrometer and held with a set screw. With the micrometer, therefore the height by which the shaft moves can be adjusted from about 0–0.1 inches. The precise level of the micrometer is set by the user, and generally would be based on the volume of liquid to be dispensed, and the viscosity of the liquid. Generally, the micrometer will be higher (closer to the clip), thus raising the shaft higher, if the volume and/or viscosity is high.

Figure 5A:
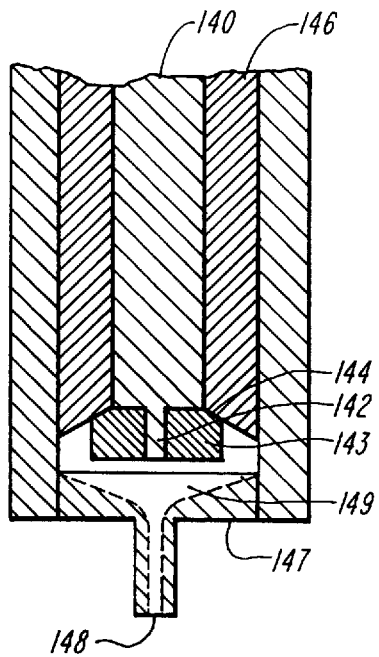
FIGS. 5(a)–5(b) are cross-sectional view of a fourth embodiment of the present invention with a valve arrangement that is different from that in the first embodiment.
Figure 5B:
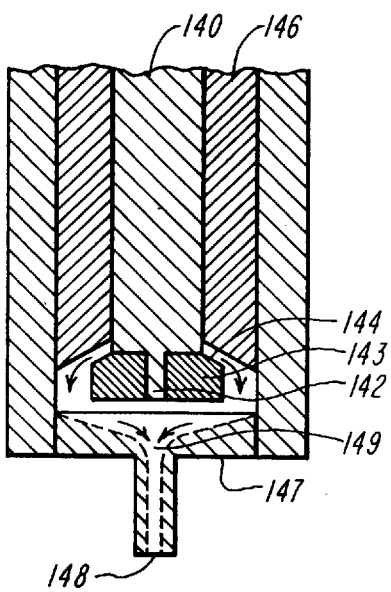

Referring to FIGS. 5(a) and 5(b), in a fourth embodiment, the dispenser has an annular valve seat formed in a cartridge housing. Screw 140 has a reduced diameter lower end 142 that is threaded, and includes a nut 143 screwed over lower end 142. The nut, which is preferably made of carbide or some other hand material, has a chamfered upper, outer edge 144. Screw 140 is mounted in cartridge housing 146, and thus defines an augering chamber between screw 140 and housing 146. The lower part of the housing is shaped so that it creates an annular valve seat that is opened and closed by contact with edge 144 of nut 143. A nozzle 147 is positioned under nut 143.

When the screw is in an upper position as shown in FIG. 5(a), the liquid is sealed within the chamber and cannot get to an outlet 148 of nozzle 147. When the screw is lowered, as shown in FIG. 5(b), an annular flow path is created from the annular chamber as shown by the arrows. The liquid can thus flow through a passageway 149. When a dispensing cycle is completed, the screw is raised again into the valve seat as in FIG. 5(a). This raising action is also beneficial because it has a suctioning effect to help draw liquid upwardly into the augering chamber.

As shown in detail in the embodiment of FIGS. 1–3, the screw in FIG. 5 can be moved with pneumatic inputs in both directions, or the screw can be biased either upwardly or downwardly with a spring that can be overcome with a pneumatic input in the opposite direction.

Figure 6:
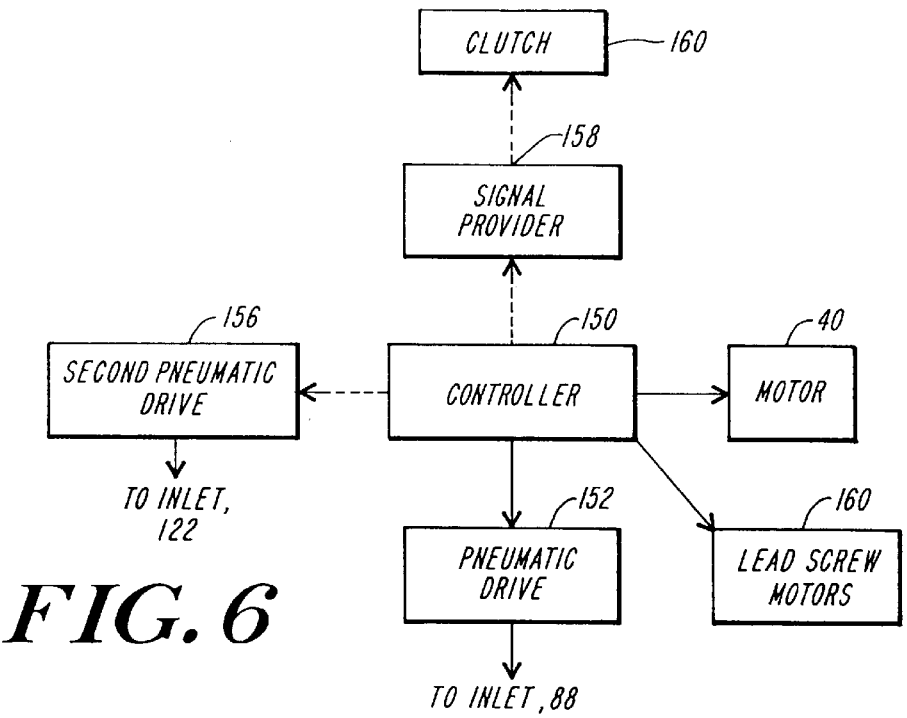
FIG. 6 is a block diagram of a control system according to the present invention.

A block diagram of a control system for operating such liquid dispensing systems as shown in FIGS. 1–5 is provided in FIG. 6. A controller 150, preferably including an appropriately programmed personal computer, provides to motor 40 drive signals that cause motor 40 to start and stop, and provides to pneumatic drive 152 signals that cause air to be provided through pneumatic inlet 88. Controller also controls other functions such as causing pressure to be provided on the liquid in a syringe and activating lead screw motors 160 that cause dispenser 10 to be moved along three mutually orthogonal axes.

In the embodiment of FIG. 3 with two air inlets for moving the piston upwardly and downwardly, controller 150 also controls movement of a second pneumatic drive 156 (which may be combined with pneumatic drive 152). In embodiments in which the motor is coupled to the screw through a clutch 160, controller 150 controls a signal provider 158 (typically provided as a circuit board in the controller) that causes the signal pulses that activate the clutch.

Software for controlling such functions is generally known in the art, and can be adapted to implement the specific functions recited above. Other generally known software would also typically be provided for receiving information about where and how liquid is to be dispensed, and for establishing a routine based on the received information.

Referring again to FIGS. 1(*a*)–1(*c*), the present invention also includes a method for dispensing a liquid on a medium. According to this method, augering screw 16 is raised away from valve seat 72 and is rotated in order to dispense liquid through outlet 15 of nozzle 14. When an appropriate amount of liquid has been dispensed, augering screw 16 is lowered so that it is in valve seat 72 and seals augering chamber 18 from outlet 15 of nozzle 14. Preferably, augering screw 16 is raised by the controller by providing a signal to the first pneumatic drive to raise the piston, and then providing a signal to a motor or to a clutch so that the motor causes the screw to turn and thus to dispense liquid. To stop dispensing, the signal to the motor or clutch, and the signal to the pneumatic drive are changed; or a signal is provided to the second pneumatic drive in the embodiment of FIG. 3.

In the embodiment of FIG. 5, the method includes lowering the screw to open a passageway from the chamber, turning the screw to auger liquid, and then raising the screw to seal from the chamber.

Figure 7A:
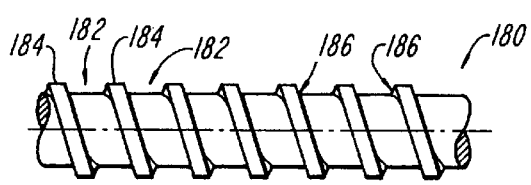
FIGS. 7(a), 7(b), and 7(c) are cross-sectional views of a prior art augering screw, and first and second embodiments of an augering screw according to the present invention, respectively.
Figure 7B:
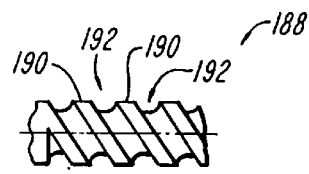
Figure 7C:
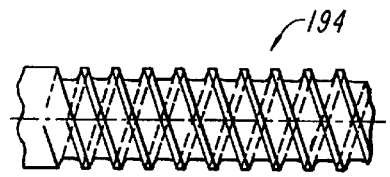

Referring to FIGS. 7(*a*)–7(*c*), to further improve repeatability and to prevent air from being trapped in the corners of an augering screw with square contour between the threads, the screw has been redesigned from prior screw designs. Referring to FIG. 7(*a*), a prior screw 180 that has been used in liquid dispensers has threading with rectangular cross-sectional regions 182 between threads 184. The maximum diameter (including the threads) is about 0.2 inches, and regions 182 have a depth of about 0.01–0.03 inches and an axial length of about 0.045 inches. While such a design appears to be desirable because it provides a large volume between threads for the liquid, it has been found that the liquid does not completely fill the regions and air gets in corners 186 of regions 182. Because air compresses under force, when the force stops, the air in the corners can expand and push outwardly on the liquid around is screw 16, thus encouraging the liquid to leak through the nozzle.

Referring to FIG. 7(*b*), in a first embodiment of an augering screw according to the present invention, screw 188 has threads 190 with regions 192 between threads having a curved contour rather than a square contour. In this embodiment, the threads are angled at about 34°, the maximum diameter of the screw (thread to thread) is about 0.1–0.2 inches, and the contour between threads has a radius of about 0.01–0.05 inches.

Referring to FIG. 7(*c*), a screw 194 has a similar maximum diameter of about 0.1–0.2 inches, and radius of about 0.01–0.05 inches. The design of screw 194 has been further altered to enhance the quantity of liquid that is dispensing per turn of the screw. The screw has a plurality of helical thread-defining channels that are evenly distributed about the circumference of the screw, preferably two channels offset by 180° as shown.

While this curved contour allows less liquid to fill around the screw than rectangular regions, the filling of the regions between the threads is more complete, and therefore less air between the threads gets compressed and can expand.

When the liquid dispensers described above are used for dispensing a liquid over a semiconductor device for encapsulation or for underfilling, the liquid can be provided in a continuous stream to cover an area, and the dispenser can be moved in a raster or spiral pattern in a horizontal plane with lead screw motors (FIG. 6). A dispenser as described above is particularly appropriate for such an application because the application requires a high degree of accuracy.

Figure 8:
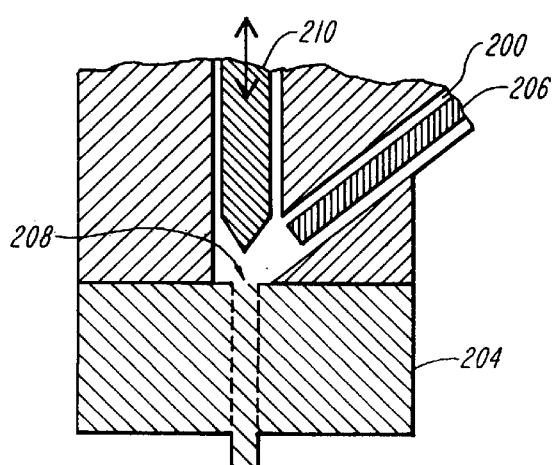
FIG. 8 is a cross-sectional view of an embodiment of a dispenser with an augering screw and a needle valve.

Referring to FIG. 8, controlling the flow of liquid between an augering chamber 200 and an outlet 202 of a nozzle 204 can also be accomplished with other types of valves. In this example, an augering screw 206 is provided at an acute angle relative to the horizontal and vertical axes to provide liquid through an upper opening 208 at the top of nozzle 204. As discussed above, augering screw 206 is driven by a motor either directly or through a clutch to meter liquid through the nozzle. In addition to controlling screw 206 through a motor, the controller also controls needle 210 to move it vertically to selectively seal and expose opening 208 to prevent liquid from flowing or to allow liquid to flow. The valving function could be performed with some other type of valve, such as a ball valve, which has an off-center opening that can be moved into and out of alignment with an opening in a nozzle.

The devices with a needle valve, a ball valve, or some other valve that is independent of an augering screw are provided here as alternatives, but these alternatives are less desirable than the devices shown in FIGS. 1(*a*)–1(*c*), 3, 4, and 5, which allow both the metering function and the valving function to be accomplished with a single screw, thus providing better control over liquid flow, and allowing the dispenser to be provided in a compact arrangement that need not be any larger in volume than a comparable dispenser without such an axially movable augering screw.

Having described preferred embodiments of the present invention, it should be apparent that modifications can be made without departing from the scope of the claims appended below. For example, the use of the terms upward, downward, horizontal, and vertical are provided for relative movement, but the dispenser could be disposed with other orientations.

What is claimed is:

1. A method for dispensing small metered amounts of liquid with an augering screw from an augering chamber to a nozzle, the method comprising the steps of:

(a) moving the augering screw from a sealing position in which the augering screw is in a valve seat to create a seal to a dispensing position;

(b) rotating the augering screw to cause liquid to be dispensed from the augering screw to the nozzle; and (c) moving the augering screw from the dispensing position to the sealing position to seal the augering chamber from the nozzle.

2. The method of claim 1, wherein one of step (a) and step (c) includes introducing a fluid input to move a member coupled to the augering screw, and the other of step (a) and step (c) includes ceasing introducing the fluid input.

3. The method of claim 1, wherein step (b) includes starting a motor rotatably coupled to the auger screw.

4. The method of claim 1, wherein step (b) includes providing a signal to a clutch to connect a motor and the augering screw.

5. The method of claim 1, wherein step (a) includes axially raising the screw toward the nozzle, and step (c) includes axially lowering the screw toward the nozzle.

6. The method of claim 1, wherein step (a) includes axially lowering the screw toward the nozzle, and step (c) includes axially raising the screw away from the nozzle.

7. The method of claim 1, wherein step (b) includes moving the augering screw and chamber over an integrated circuit chip and dispensing a high viscosity liquid to thereafter encapsulate the chip.

8. The method of claim 1, wherein step (b) includes rotating an augering screw with threads having rounded contours along the axial direction so that there are no squared corners in the threads.

9. The method of claim 1, wherein step (b) includes moving the augering screw and chamber around an integrated circuit chip mounted over a medium and dispensing an underfilling material that can wick under the chip.

10. The method of claim 1, further comprising the steps, prior to step (a), of moving the augering screw and chamber in an x-y plane to a desired location, and moving the augering screw and chamber along a z-axis perpendicular to the x-y plane toward a medium onto which liquid is to be dispensed.

11. The method of claim 10, further comprising the steps, after step (c), of moving the augering screw and chamber along the z-axis away from the medium, moving the augering screw and chamber in an x-y plane to a next desired location, and moving the augering screw and chamber along the z-axis toward the medium.

12. An apparatus for dispensing small metered amounts of liquid onto a medium, the apparatus comprising:
   a housing;
   an augering screw having a lower end and mounted in the housing, the augering screw and housing defining an augering chamber for receiving liquid;
   a nozzle fluidly coupled to said augering chamber for receiving liquid from said augering chamber and having an outlet for dispensing the received liquid onto the medium;
   a valve seat between said augering chamber and said outlet of said nozzle; and
   means for axially moving said augering screw between a sealing position in which said lower end of said augering screw is in said valve seat to substantially seal said augering chamber from said outlet of said nozzle, and a dispensing position in which a fluid passage is open between said augering screw and said outlet of said nozzle.

13. The apparatus of claim 12, wherein said augering screw is part of a drive shaft, and said moving means includes:
   a retainer clip rigidly coupled to said drive shaft; and
   a piston disposed around said drive shaft and positioned at least close to said retainer clip, said piston being axially movable relative to said drive shaft to contact said retainer clip for axially moving said retainer clip, said drive shaft, and said augering screw.

14. The apparatus of claim 12, wherein said valve seat is formed in an end of said nozzle opposite to said outlet.

15. The apparatus of claim 12, wherein said valve seat includes an annular region in said housing.

16. The apparatus of claim 12, wherein said augering screw has threads, said augering screw having a curved contour in an axial direction between adjacent threads.

17. The apparatus of claim 16, wherein said augering screw has a plurality of thread-defining channels.

18. The apparatus of claim 12, wherein the screw has threads with a rounded contour between the threads along an axial direction so that there are no squared corners.

19. The apparatus of claim 18, wherein the threads are cut with at least two separate channels, each in a helical pattern.

20. An apparatus for dispensing small amounts of liquid onto a medium, the apparatus comprising:
   an augering chamber for receiving liquid;
   a nozzle fluidly coupled to said augering chamber for receiving liquid from said augering chamber and having an outlet for dispensing the received liquid onto the medium, said augering chamber and said nozzle at least partly defining a passageway for the liquid to flow;
   an augering screw housed in said augering chamber for augering liquid from said augering chamber through said passageway; and
   a valve in said passageway and controllable between a closed position in which said valve seals said passage sufficiently to substantially prevent liquid from flowing between said augering chamber and said outlet of said nozzle and an open position in which liquid can flow through said passage, the valve being held closed to seal the passage except when the apparatus is dispensing.

21. The apparatus of claim 20, wherein said valve includes an opening formed in said nozzle.

22. The apparatus of claim 20, further comprising a controller for controllably causing said augering screw to rotate and for controllably moving said valve.

23. The apparatus of claim 22, wherein said valve is a needle valve.

24. The apparatus of claim 22, wherein said valve is a ball valve.

25. An apparatus for dispensing small amounts of liquid onto a medium, the apparatus comprising:
   an augering chamber for receiving liquid;
   a nozzle fluidly coupled to said augering chamber for receiving liquid from said augering chamber and having an outlet for dispensing the received liquid onto the medium, said augering chamber and said nozzle at least partly defining a passageway for the liquid to flow;
   an augering screw housed in said augering chamber for augering liquid from said augering chamber through said passageway;
   a valve in said passageway and controllable between a closed position in which said valve seals said passage sufficiently to substantially prevent liquid from flowing between said augering chamber and said outlet of said nozzle and an open position in which liquid can flow through said passage; and
   a controller for controllably causing said augering screw to rotate and for controllably moving said valve, said valve including a valve seat in said passageway, and said controller controlling a position of said valve by causing said augering screw to move axially into and out of said valve seat.

26. An apparatus, for dispensing small amounts of liquid onto a medium, the apparatus comprising:
   an augering chamber for receiving liquid;
   a nozzle fluidly coupled to said augering chamber for receiving liquid from said augering chamber and having an outlet for dispensing the received liquid onto the medium, said augering chamber and said nozzle at least partly defining a passageway for the liquid to flow;
   an augering screw housed in said augering chamber for augering liquid from said augering chamber through said passageway; and a valve in said passageway and controllable between a closed position in which said valve seals said passage sufficiently to substantially prevent liquid from flowing between said augering chamber and said outlet of said nozzle and an open position in which liquid can flow through said passage, wherein said valve includes an annular ring about said screw.

27. An apparatus for dispensing small metered amounts of liquid onto a medium, the apparatus comprising:

a housing;

an augering chamber mounted in the housing for receiving liquid;

a nozzle fluidly coupled to the augering chamber for receiving liquid from the augering chamber and having an outlet for dispensing the received liquid onto the medium; and an augering screw mounted in the chamber and axially movable relative to the chamber between a sealing position, in which the lower end of the augering screw is in the valve seat to substantially seal the augering chamber from the outlet of the nozzle, and a dispensing position, in which a fluid passage is open between the augering screw and the outlet of the nozzle.

28. The apparatus of claim 27, wherein the screw has threads with a rounded contour between the threads along an axial direction so that there are no squared corners in the threads.

29. The apparatus of claim 28, wherein the threads of the screw are cut with at least two separate channels, each in a helical pattern.

* * * * *